March 29, 1966 G. E. LUSK 3,243,499
CABLE TERMINATION SYSTEM WITH GIRDLE SHIELD
Filed Dec. 16, 1963 2 Sheets-Sheet 1
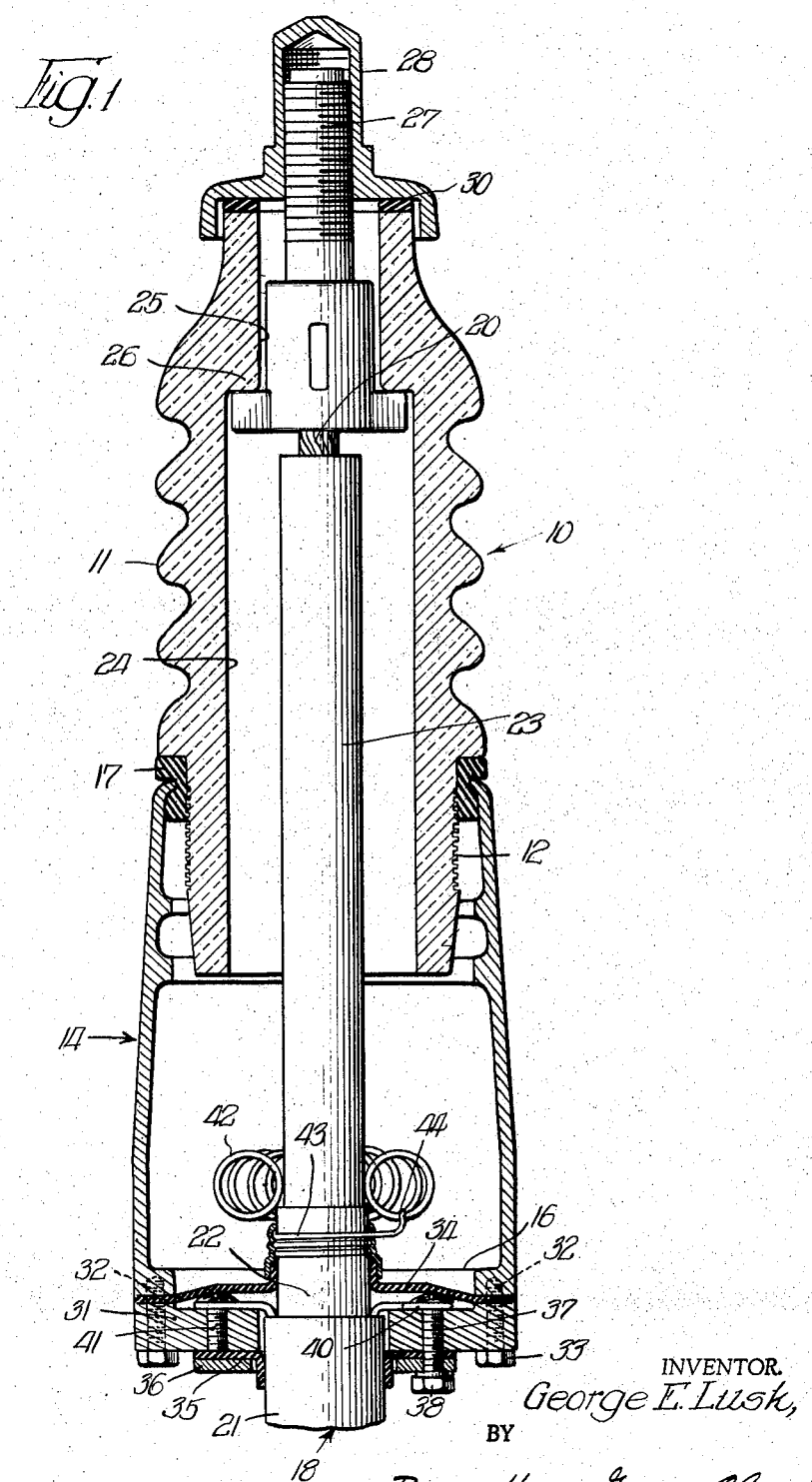
INVENTOR.
George E. Lusk,
BY
Byron Hume Groen & Clement
Attys.

March 29, 1966  G. E. LUSK  3,243,499
CABLE TERMINATION SYSTEM WITH GIRDLE SHIELD
Filed Dec. 16, 1963  2 Sheets-Sheet 2
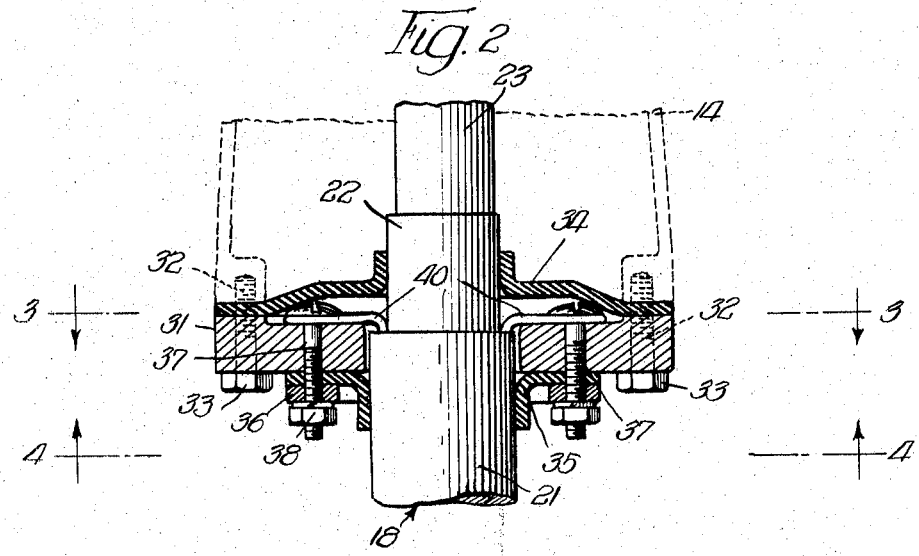
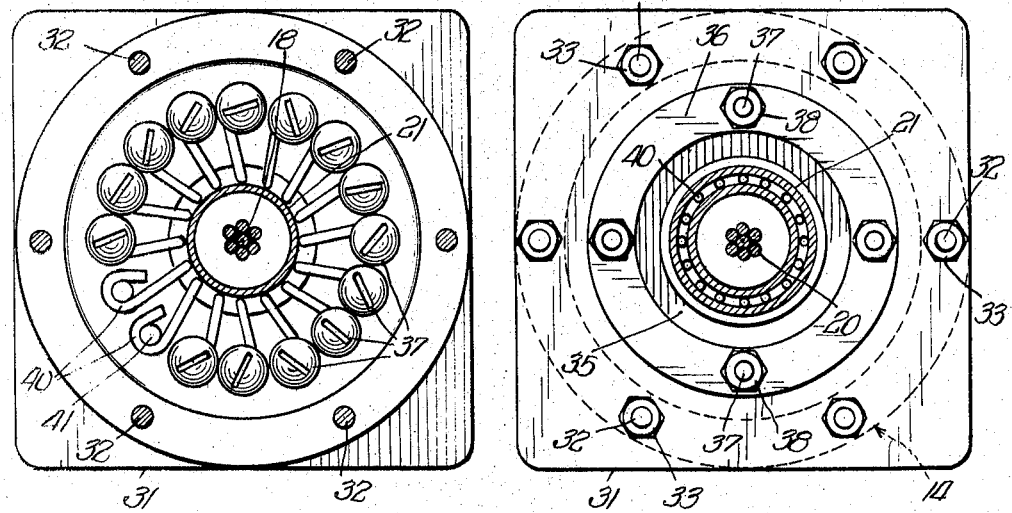
INVENTOR.
George E. Lusk,
BY
Byron Hume Green & Clement
Attys 3,243,499
CABLE TERMINATION SYSTEM WITH GIRDLE
SHIELD
George E. Lusk, Downers Grove, Ill., assignor to G & W
Electric Specialty Company, Blue Island, Ill., a corporation of Illinois
Filed Dec. 16, 1963, Ser. No. 330,817
4 Claims. (Cl. 174—73)

The invention relates to a cable termination system especially designed for polyethylene insulated concentric strand cables although with minor modifications in the materials used the system can be made suitable for other cables of a different type.

The basic object of the invention resides in the provision of a cable termination system which will employ an improved entrance seal between the pothead structure and the cable in combination with a girdle shield for the cable in the shape of a closed circular spring of relatively large size diameter wire and a special compound capable of maintaining a void-free area within the pothead structure and particularly in the vicinity of the girdle shield.

Potheads that have been used in the past to terminate the polyethylene type of cables have normally required the use of built up stress cones with the usual shielding braid flux control system and the potheads were filled with a compound including asphaltic based materials and certain of the low molecular weight polybutenes. Also the entrance assemblies used on these potheads were in general of two types, one the so-called stuffing box type entrance sealing system which depended upon the compression of gasket material against the cable insulation to develop the required seal and two, an entrance sealing system called the tube seal type where the sealing was obtained by virtue of pressure sensitive or adhesive backed tapes applied over the end of an intermediate tube surrounding the cable proper and the cable jacket itself.

Although the asphaltic based compounds have given satisfactory service for over fifty years, several characteristics of these compounds leave something to be desired. These compounds would flow or leak at normal operating temperatures and their power factor characteristic was temperature sensitive and tended to increase on higher operating temperature ranges. The specific inductive capacitance or dielectric constant of these materials are relatively high for polyethylene and some of the newer cable insulations. An advantage can be obtained with the use of a compound in potheads or joint structures if its specific inductive capacitance can be made to match or be just slightly greater than that of the basic cable insulation. A large specific inductive capacitance mismatch tends to amplify the dielectric problems associated with the interface between the compound and the insulation by increasing the longitudinal gradient effect in direct relation to the ratio of the specific inductive capacitance. A uniform specific inductive capacitance will tend to make the overall dielectric system more isotropic and hence considerably improve the dielectric operational characteristics of the system. The asphaltic base compounds also had another problem associated with them which involved their physical characteristics at very low temperatures and temperatures below freezing. Some of the compounds tend to crack and shrink in the lower temperature ranges.

The stuffing box type entrance obtained its seal by the action of compressing an elastomeric type gasket material or impregnated twine in a cavity surrounding the cable proper. The amount of force transferred by the sealing material to the cable insulation sometimes equals or exceeds 600 pounds per square inch pressure. This force is excessive on some types of cable insulation including the butyl rubber insulation, polyethylene insulation and the like, in that these materials have relatively poor creep characteristics. In time these insulations move away from the stuffing box sealing area causing a diminution of the sealing pressure and increase the possibility of a leak at this point. However, more importantly, the creep of the insulation results in a reduction of the insulation wall at this point. This can and has caused dielectric failure in these areas.

In view of the foregoing another and more specific object of the invention is to provide a cable termination system which will eliminate many of the objectionable features inherent in the prior systems and which will additionally result in a reduction in installation time for the pothead structures.

Another object is to provide a termination system for concentric polyethylene cable and the like which will employ a girdle shield in the place of the usual tape stress cone reinforcement over the cable insulation. An obvious advantage in using a girdle shield, and which is made possible by the special filling compound within the pothead, is the elimination of the construction time of the usual stress cone device and also the elimination of the dependency on the installation man in the field in building up a stress cone to the proper dimensions and shape.

A further object of the invention is to provide a novel and improved entrance device for the cable of a pothead structure which will employ a pair of diaphragms so constructed and arranged as to improve the sealing efficiency as the internal pressures within the pothead increase and without requiring an additional auxiliary sealing force.

With these and various other objects in view the invention may consist of certain novel features of construction and operation, as will be more fully described and particularly pointed out in the specification, drawings and claims appended thereto.

In the drawings which illustrate an embodiment of the device and wherein like reference characters are used to designate like parts—

FIGURE 1 is a vertical sectional view of a pothead assembly showing a cable termination system incorporating the improved features of the invention;

FIGURE 2 is a fragmentary vertical sectional view illustrating the structural details of the entrance seal between the cable and the pothead assembly;

FIGURE 3 is a horizontal sectional view, taken substantially along line 3—3 of FIGURE 2 and showing the threaded screws for securing the concentric cable strands to the entrance plate; and FIGURE 4 is a horizontal sectional view taken substantially along line 4—4 of FIGURE 2.

The invention as applied to a polyethylene insulated concentric strand cable is illustrated in FIGURE 1 wherein the numeral 10 indicates an insulator formed of any suitable ceramic material and having the outwardly projecting skirts 11 and the serrations 12. The base member 14 is combined with the insulator 10 to form the pothead asembly, the said base member comprising a metal casting having a reinforced bottom section 16 and a top end which is curved inwardly for interengaging relation with the resilient gasket 17. By means of the resilient gasket the insulator 10 and the base member 14 are physically connected to form the unitary pothead assembly. The gasket effectively seals the interior of the assembly permitting, however, limited adjusting movement of a pivotal nature as regards the insulator 10.

The cable indicated in its entirety by numeral 18 provides the copper wires 20 forming the cable conductor and which is conventionally covered and shielded by the cable jacket 21, by the cable over-shield 22 and by the polyethylene cable insulation 23. The terminal end of the cable is placed within the bore 24 to extend axially within the pothead assembly so that the assembly has telescoping relation therewith. Said end of the cable is stripped to expose the copper wires 20 and to which the metal connector 25 is fixed. The shoulder 26 within the insulator 10 rests on the base of the connector which in turn provides the threaded extension 27. The metal cap nut 28 is threaded to the extension to provide the exterior electrical connection for the cable. The gasket 30 which is confined between the cap nut 28 and the insulator 10 functions to seal this end of the pothead assembly.

The opposite bottom end of the assembly is closed by the entrance plate 31 consisting of brass or other suitable metal and which is fixedly secured to the member 14 by the securing screws 32 which have their hexagonal shaped heads 33 located below and in contact with the underside of the entrance plate 31. In accordance with the invention the seal between the member 14, the cable jacket 21 and the entrance plate 31 is formed by a pair of resilient and flexible diaphragms including an inner diaphragm 34 and an outer diaphragm 35. As regards both diaphragms, a hole is punched or molded in the same and which is smaller than the diameter of the cable jacket to which it is to be applied. The size of the hole depends upon the amount of ultimate elongation desired when the diaphragm is placed over the cable. In sliding the diaphragm with the small sized punched opening therein over the cable, the said diaphragm takes the shape of a cone section, thus having a close and snug fit around the cable to be sealed. No additional pressure back-up devices are used to provide the seal. Consequently the amount of stress put on the cable wall is a minimum.

The inner diaphragm 34 is confined around its periphery between the reinforced base 16 of the metal casting 14 and the entrance plate 31. For the outer diaphragm 35 a clamping ring 36 is provided and which is located under the said diaphragm and in contact therewith. At least four securing screws such as 37 are employed with lock washers and nuts 38 for fastening the clamping ring 36 to the entrance plate 31, with the diaphragm 35 being confined therebetween.

The present design of entrance seal affords the added advantage in that it is entirely suitable for terminating the concentric strand type of polyethylene insulated cable. Such cables have an overall conductor consisting of a multiple strand layer of copper wires identified by numeral 40. The said copper wires which at times may total 16 in number afford problems of termination in the standard type of entrance systems. For the present improved entrance seal a series of holes are drilled in the entrance plate and the concentric wires are terminated by wrapping their ends around the securing screws 37 and also around the self-tapping screws 41, both of which have threaded relation in the holes formed in the entrance plate, all as best shown in FIGURE 1. The screws 41 are made just long enough to equal the thickness of the clamping plate 31. The four securing screws 37 are made longer to receive and secure the external clamping ring 36. Thus the clamping plate 36 seals the external diaphragm 35 to the entrance plate 31 and the combined arrangement seals the holes in the entrance plate which are provided for the self-tapping screws.

The shielding of the cable with respect to the pothead assembly is effectively accomplished by a girdle shield 42 which may have the shape of a closed annular spring of relatively large diameter wire. The inside diameter of the annular spring in its relaxed position should be somewhat smaller than the cable insulation diameter so that when the girdle shield is applied around the cable it will be under slight tension and consequently will have a tight and conductive contact with the cable insulation wall as illustrated. A grounding conductor for the girdle shield is provided in the form of a wire 43 which is applied to the cable overshield 22 so as to have good contact therewith, and which in turn has contact with the girdle shield at 44. It may be possible to employ a girdle of elliptical shape which would make the location of the same in the pothead assembly less critical.

The compound contemplated by the invention for filling the interior of the pothead assembly has a dielectric constant or specific inductive capacitance closely approximating that of the polyethylene used on the cable, and because of this the compound will provide a dielectrically compatible system of isotropic nature. Consequently the design does not require the usual tape stress cone reinforcement over the cable, but is able to utilize the girdle shield as described. Since the shield is constructed of wire the compound will completely fill the area around the girdle and around the cable insulation without the formation of gas pockets, bubbles or the like. This is a highly important consideration in the higher operating stress areas. A shield made of a metal cone might not be acceptable for the reason that in the filling operation there would always be a possibility of forming a gas pocket at the apex of the shield with the cable insulation.

The preferred compound consists of a mixture of high molecular weight polybutenes and low molecular weight polyolefins, and is characterized by a high tack value as regards the polyethylene insulation, the porcelain shell of the pothead, and the metal of the girdle shield down to temperatures as low as minus 20 degrees Fahrenheit. The filling compound should also retain its flexibility at low temperature levels and the same should have a relatively low coefficient of expansion. These characteristics are highly important in the successful operation of the present termination system since a void-free area must be maintained within the pothead assembly and particularly within the girdle shield area. The obvious advantage of employing the girdle shield and which is made possible by the special compound resides in the elimination of the construction time for the usual stress cone system and also in the elimination of the dependency on the installation man in the field in building up the stress cone to the proper dimensions and shape. It is further possible with the present termination system to reduce the length of the pothead assembly by approximately fifty percent over that previously required to terminate the same particular type of cable.

The material employed for the interior and exterior diaphragms will depend to a certain extent upon the type of cable insulation being terminated. Two materials have been successfully used, one comprising a high temperature Buna N elastomer, and the other comprising a high temperature, high strength silicone elastomer. The direction of application of the two diaphragms is specific since they are so located as to be self-energizing. The interior diaphragm seals tighter as the internal pressure of the vehicle it is sealing increases. Consequently, the gasket sealing efficiency improves as the internal pressure increases without requiring additional auxiliary sealing forces. It will be observed that that exterior diaphragm is positioned opposite that of the interior diaphragm so that if a vacuum develops in the sealed vessel, the exterior diaphragm will tighten up to improve its sealing characteristics and eliminate leakage to the system from the atmosphere. For the exterior diaphragm a silicone elastomer is preferred in order to afford the greatest possible protection against environmental degradation such as ultraviolet radiation, ozone attack or oxidation. Also, the special silicone material employed should provide a completely compatible system capable of operating at temperatures as low as minus 60 degrees Fahrenheit.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:
1. In a termination system for a power cable, the combination with a pothead assembly having telescoping rela- tion with the terminal end of the power cable, said power cable having an encircling sheath comprising a multiple strand layer of metal wires, of sealing means for sealing the entrance end of the pothead assembly including an entrance plate fixed to said entrance end and having a central opening through which the cable extends, securing means respectively anchoring the terminal ends of the said metal wires to the inside surface of the entrance plate, an inner diaphragm and an outer diaphragm located on opposite sides of the entrance plate, said inner diaphragm being located over the entrance plate so as to cover the means anchoring the metal wires, the inner diaphragm being sealed around its periphery to the entrance plate and having a central opening through which the cable extends and with the edges of the opening in sealing contact with the cable, the outer diaphragm also having a central opening through which the cable extends and with the edges of the central opening in close contact with the cable, and a clamping ring fixed to the entrance plate and clamping the outer diaphragm between the plate and the ring.

2. In a termination system as defined by claim 1, additionally including a girdle shield in the form of a closed annular coil spring, said girdle shield having surrounding relation with the cable and having contact with the cable within the pothead assembly and immediately above the inner diaphragm.

3. In a termination system as defined by claim 1, additionally including a girdle shield in the form of a closed annular coil spring, said girdle shield having surrounding relation with the cable and having contact with the cable within the pothead assembly and immediately above the inner diaphragm, and a compound filling the interior of the pothead assembly, said compound comprising a mixture of high molecular weight polybutenes and low molecular weight polyolefins, and said compound having a high tack value and having the ability to retain its flexibility at low temperatures.

4. In a termination system for a power cable, the combination of a pothead assembly having telescoping relation with the terminal end of the power cable, said power cable having an encircling sheath comprising a multiple strand layer of metal wires and said terminal end being stripped to expose the cable insulation and the said metal wires, of sealing means for sealing the entrance end of the pothead assembly with respect to the terminal end of the cable, said sealing means including an entrance plate secured to the entrance end of the pothead assembly, securing means anchoring the terminal ends of the metal wires, respectively, to the inside surface of the entrance plate, an inner diaphragm and an outer diaphragm located on respective sides of the entrance plate and being sealed thereto around their peripheries, the outer diaphragm having sealing contact approximately centrally thereof with the cable sheath and the inner diaphragm having sealing contact approximately centrally thereof with the cable insulation, a girdle shield in the formed of a closed annular coil spring in surrounding relation with and having contact with the cable insulation within the pothead assembly above the inner diaphragm, and a filling material of a plastic nature filling the interior of the pothead assembly.

References Cited by the Examiner

UNITED STATES PATENTS

| | | | |
|---|---|---|---|
| 1,762,510 | 6/1930 | Edmonds | 174—89 X |
| 1,891,213 | 12/1932 | Edmonds | 174—89 X |
| 1,972,590 | 9/1934 | Higgins | 174—142 |
| 3,151,209 | 9/1964 | D'Ascoli et al. | 174—19 |

FOREIGN PATENTS

| | | |
|---|---|---|
| 1,237,644 | 6/1960 | France. |
| 564,029 | 12/1955 | Italy. |

ROBERT K. SCHAEFER, *Primary Examiner.*

JOHN F. BURNS, *Examiner.*

W. B. FREDRICKS, J. F. RUGGIERO,
*Assistant Examiners.*